United States Patent
Wang

(10) Patent No.: US 10,728,063 B2
(45) Date of Patent: Jul. 28, 2020

(54) SAMPLER REFERENCE LEVEL, DC OFFSET, AND AFE GAIN ADAPTATION FOR PAM-N RECEIVER

(71) Applicant: Rambus Inc., Sunnyvale, CA (US)

(72) Inventor: Nanyan Wang, Cupertino, CA (US)

(73) Assignee: Rambus Inc., San Jose, CA (US)

(*) Notice: Subject to any disclaimer, the term of this patent is extended or adjusted under 35 U.S.C. 154(b) by 0 days.

(21) Appl. No.: 16/593,815

(22) Filed: Oct. 4, 2019

(65) Prior Publication Data

US 2020/0145262 A1 May 7, 2020

Related U.S. Application Data

(63) Continuation of application No. 15/957,737, filed on Apr. 19, 2018, now Pat. No. 10,461,969, which is a continuation of application No. 15/528,641, filed as application No. PCT/US2015/063009 on Nov. 30, 2015, now Pat. No. 9,979,571.

(60) Provisional application No. 62/093,012, filed on Dec. 17, 2014.

(51) Int. Cl.
| | |
|---|---|
| *H03D 1/00* | (2006.01) |
| *H04L 27/06* | (2006.01) |
| *H04L 25/06* | (2006.01) |
| *H04L 27/00* | (2006.01) |
| *H04L 25/49* | (2006.01) |
| *H04L 5/00* | (2006.01) |

(52) U.S. Cl.
CPC .......... *H04L 25/066* (2013.01); *H04L 5/0048* (2013.01); *H04L 25/4917* (2013.01); *H04L 27/0002* (2013.01)

(58) Field of Classification Search
CPC ............... H04L 25/066; H04L 27/0002; H04L 25/4917; H04L 5/0048; H04L 5/03057; H04L 25/063; H04L 7/0337
USPC .................................. 375/340, 353, 345, 344
See application file for complete search history.

(56) References Cited

U.S. PATENT DOCUMENTS

| | | | |
|---|---|---|---|
| 4,407,020 A * | 9/1983 | Helliwell ................. | H04J 3/10 341/118 |
| 5,960,042 A | 9/1999 | Chang et al. | |
| 6,735,260 B1 | 5/2004 | Eliezer et al. | |

(Continued)

OTHER PUBLICATIONS

Balan et al., "A 130mW 20Gb/s Half-Duplex Serial Link in 28nm CMOS", Paper 26.1, 2014 IEEE International Solid-State Circuits conference, Session 26, pp. 436-439. 3 pages.

(Continued)

*Primary Examiner* — Phuong Phu
(74) *Attorney, Agent, or Firm* — Fenwick & West LLP

(57) ABSTRACT

In a PAM-N receiver, sampler reference levels, DC offset and AFE gain may be jointly adapted to achieve optimal or near-optimal boundaries for the symbol decisions of the PAM-N signal. For reference level adaptation, the hamming distances between two consecutive data samples and their in-between edge sample are evaluated. Reference levels for symbol decisions are adjusted accordingly such that on a data transition, an edge sample has on average, equal hamming distance to its adjacent data samples. DC offset may be compensated to ensure detectable data transitions for reference level adaptation. AFE gains may be jointly adapted with sampler reference levels such that the difference between a reference level and a pre-determined target voltage is minimized.

20 Claims, 14 Drawing Sheets

(56) References Cited

U.S. PATENT DOCUMENTS

| | | |
|---|---|---|
| 7,099,400 B2 | 8/2006 | Yang et al. |
| 7,215,721 B2 | 5/2007 | Hietala et al. |
| 7,248,640 B2 | 7/2007 | Gorecki et al. |
| 7,308,044 B2 | 12/2007 | Zerbe et al. |
| 7,308,048 B2 | 12/2007 | Wei |
| 7,397,848 B2 | 7/2008 | Stojanovic et al. |
| 7,400,694 B1 | 7/2008 | Sonntag et al. |
| 7,616,700 B2 | 11/2009 | Kim et al. |
| 8,199,866 B2 | 6/2012 | Fuller et al. |
| 8,249,207 B1 | 8/2012 | Nissen et al. |
| 8,576,903 B2 | 11/2013 | Raphaeli et al. |
| 8,594,262 B2 | 11/2013 | Slezak et al. |
| 8,750,406 B2 | 6/2014 | Pan et al. |
| 8,837,573 B2 | 9/2014 | Doron et al. |
| 9,979,571 B2 * | 5/2018 | Wang ................. H04L 27/0002 |
| 10,461,969 B2 * | 10/2019 | Wang ................. H04L 25/4917 |
| 2003/0035497 A1 | 2/2003 | Gorecki et al. |
| 2004/0141567 A1 | 7/2004 | Yang et al. |
| 2005/0058234 A1 * | 3/2005 | Stojanovic ............ H04L 7/0331 375/371 |
| 2005/0134305 A1 * | 6/2005 | Stojanovic ............ H04L 25/028 326/31 |
| 2005/0134307 A1 * | 6/2005 | Stojanovic ............ H04L 25/028 326/31 |
| 2005/0201491 A1 | 9/2005 | Wei |
| 2006/0233278 A1 | 10/2006 | Zerbe et al. |
| 2007/0171998 A1 | 7/2007 | Hietala et al. |
| 2008/0318534 A1 | 12/2008 | Mak et al. |
| 2010/0117706 A1 | 5/2010 | Stojanovic et al. |
| 2010/0215091 A1 | 8/2010 | Palmer |
| 2011/0222635 A1 | 9/2011 | Kim et al. |
| 2013/0094561 A1 | 4/2013 | Raphaeli et al. |
| 2013/0128943 A1 | 5/2013 | Doron et al. |
| 2013/0195155 A1 | 8/2013 | Pan et al. |
| 2013/0241622 A1 | 9/2013 | Zerbe et al. |
| 2014/0036977 A1 | 2/2014 | Bucher et al. |

OTHER PUBLICATIONS

PCT Notification of Transmittal of the International Search Report and the Written Opinion of the International Searching Authority, or the Declaration, PCT Application No. PCT/US15/063009, dated Jan. 22, 2016, 10 pages.

\* cited by examiner

SAMPLER REFERENCE LEVEL, DC OFFSET, AND AFE GAIN ADAPTATION FOR PAM-N RECEIVER

CROSS-REFERENCE TO RELATED APPLICATIONS

This application is a continuation of U.S. patent application Ser. No. 15/957,737, filed on Apr. 19, 2018, now U.S. Pat. No. 10,461,969, which application is a continuation of U.S. patent application Ser. No. 15/528,641 entered on May 22, 2017 as a national stage application under 35 U.S.C. 371 of International Application No. PCT/US2015/063009 filed on Nov. 30, 2015, now U.S. Pat. No. 9,979,571, which claims the benefit of U.S. Provisional Patent Application No. 62/093,012 filed on Dec. 17, 2014, each of which is incorporated by reference in its entirety.

BACKGROUND

A Pulse Amplitude Modulation (PAM) receiver detects symbols in a received signal that are encoded as pulses having varying amplitude. In a PAM-N receiver, the received signal is compared to N−1 decision boundaries (e.g., reference levels) to detect one of N possible symbols. To accurately detect the symbols, each of the N−1 reference levels should be adjusted and aligned with a desired boundary. The optimal boundaries for symbol decisions are the N−1 vertical eye centers. However, the centers of the N−1 eyes of received PAM-N signal may be non-uniformly distributed and depend on the data pattern, inter-symbol interference, DC offset, equalizer adaption, analog front end (AFE) gains, and AFE nonlinearity. Furthermore, the centers of the N−1 eyes may vary with supply voltage and temperature. These factors make it difficult to maintain reference voltages at or near their optimal values. Poor alignment of the reference voltages may lead to frequency or phase lock failure.

BRIEF DESCRIPTION OF THE DRAWINGS

The teachings of the embodiments herein can be readily understood by considering the following detailed description in conjunction with the accompanying drawings.

DETAILED DESCRIPTION OF EMBODIMENTS

In a PAM-N receiver, sampler reference levels, DC offset and AFE gain may be jointly adapted to achieve optimal or near-optimal boundaries for the symbol decisions of the PAM-N signal. For reference level adaptation, the hamming distances between two consecutive data samples and their in-between edge sample are evaluated. Data transitions are detected as being, for example, even data transitions crossing an even number of decision regions or odd data transitions crossing an odd number of decision regions. Reference levels for symbol decisions are adjusted accordingly such that on a data transition, an edge sample has on average, equal hamming distance to its adjacent data samples. DC offset may be compensated to ensure detectable data transitions for reference level adaptation. Here, DC offset is first coarsely adjusted by balancing the distribution of symbols around a baseline voltage, and then finely adapted by aligning the center reference level with the baseline voltage. AFE gains may be jointly adapted with sampler reference levels such that the difference between a reference level and a pre-determined target voltage is minimized.

Figure 1:
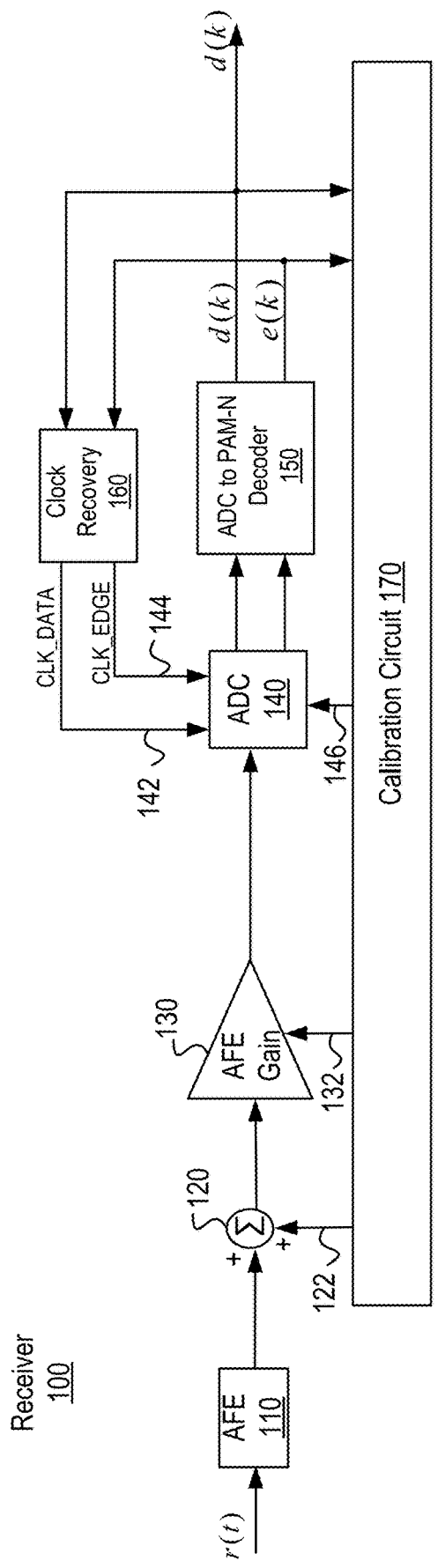
FIG. 1 is an embodiment of a PAM-N receiver.

FIG. 1 illustrates an embodiment of a PAM-N receiver 100. The receiver 100 comprises an analog front end (AFE) 110, a DC offset adjustment circuit 120, an AFE gain amplifier 130, an analog-to-digital converter 140, an ADC to PAM-N decoder 150, a clock recovery circuit 160, and a calibration circuit 170. The analog front end 110 includes components such as one or more amplifiers, one or more filters, etc. to shape an analog input signal r(t) for processing. The DC offset adjustment circuit 120 applies a DC offset to the analog signal from the analog front end 110 based on an offset control signal 122 from the calibration circuit 170. The AFE gain amplifier 130 amplifies the offset analog signal based on a gain signal 132 from the calibration circuit 170. The ADC 140 samples the analog signal using a data clock (CLK_DATA) 142 and an edge clock (CLK_EDGE) 144 to generate data symbols and edge symbols. The ADC 140 slices the input signal into one of N symbols based on N−1 reference voltages $V_0, \ldots V_{N-2}$ 146 that represent decision boundaries between adjacent symbols. In one embodiment, the edge clock 144 is 180 degrees out of phase from the data clock 142 so that an edge sample is generated at the midway point in between two consecutive data symbols. The ADC to PAM-N decoder 150 decodes the digital samples to generate data symbols d(k) and edge symbols e(k). Generally, the ADC output has more bits than the number of bits of a PAM-N symbol. The ADC to PAM-N decoder 150 converts an ADC output data into its corresponding PAM-N symbol.

The clock recovery circuit 160 receives the data symbol d(k) and edge symbol e(k) and generates the data clock 142 and the edge clock 144. The calibration circuit 170 furthermore receives the data symbols d(k) and edge symbols e(k) and calibrates the reference voltages 146, the gain control signal 132, and the DC offset control signal 122 based on the symbols.

Figure 2:
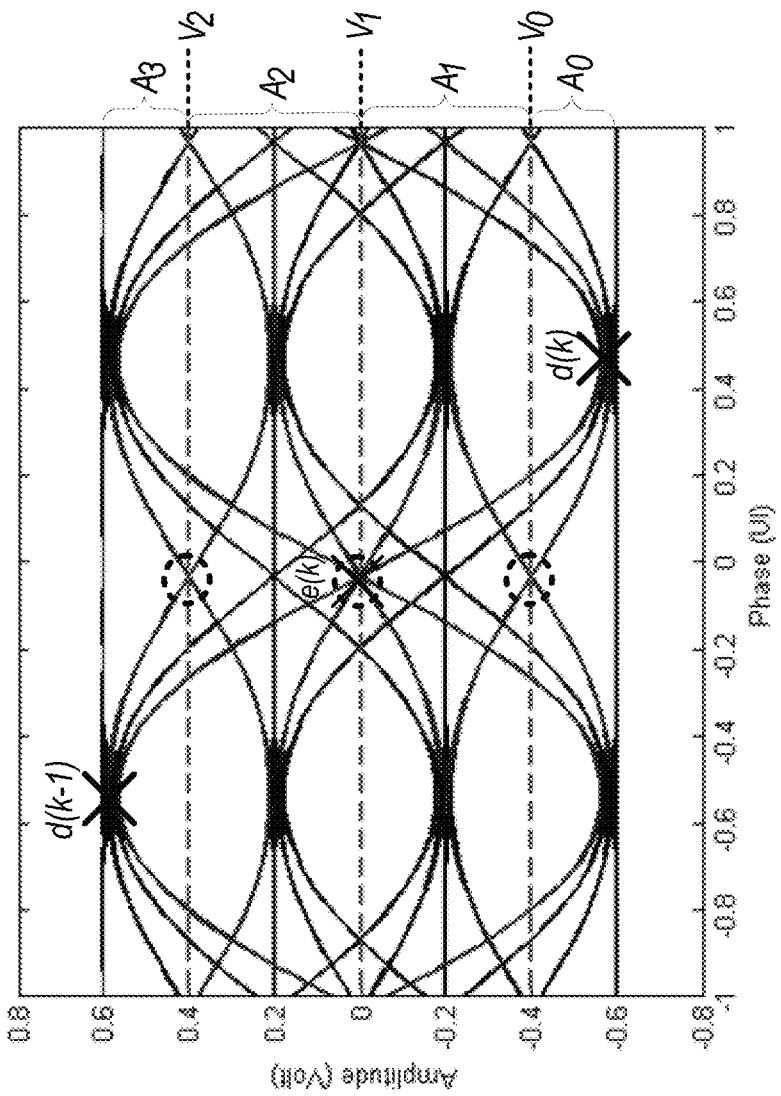
FIG. 2 is an eye diagram illustrating even transitions in a PAM-4 receiver with ideally calibrated reference voltages.

FIG. 2 is an eye diagram illustrating examples of "even transitions" between consecutive data symbols d(k−1), d(k) received by a PAM-N receiver 100. In FIG. 2, the waveforms show the pre-sliced amplitudes of the symbols. In this example, the PAM-N receiver 100 comprises a PAM-4 receiver having three reference voltages $V_0$, $V_1$, $V_2$ that provide decision boundaries between four possible symbols $A_0$, $A_1$, $A_2$, $A_3$. In an even transition, an even number of symbols or decision regions are crossed during the transition. For example, in a PAM-4 receiver, the following transitions comprise even transitions: $A_0 \rightarrow A_1$, $A_1 \rightarrow A_2$, $A_2 \rightarrow A_3$, $A_3 \rightarrow A_2$, $A_2 \rightarrow A_1$, $A_1 \rightarrow A_0$, $A_0 \rightarrow A_1 \rightarrow A_2 \rightarrow A_3$, and $A_3 \rightarrow A_2 \rightarrow A_1 \rightarrow A_0$.

FIG. 2 shows the ideal locations for each of the reference voltages. For each even transition, the crossings of the reference voltage (shown in dashed circles) of even transitions are set to maximize the opening of the eye such that the pre-sliced signal crosses the voltage reference at the midpoint between data sample times.

Figure 3:
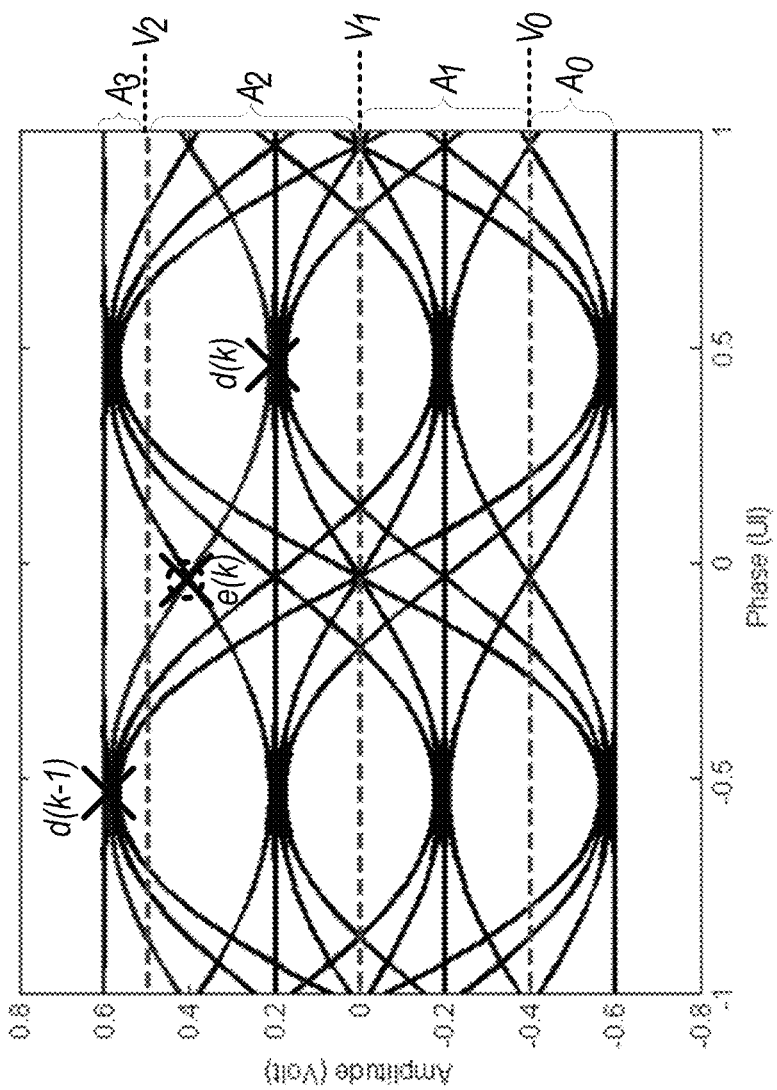
FIG. 3 is an eye diagram illustrating even transitions in a PAM-4 receiver with non-ideally calibrated reference voltages.

An "in-range transition" occurs when the initial voltage of a reference level is within the amplitude range of a transition (even if the reference level is non-optimal). For example, in FIG. 3, $V_2$ is non-ideal in terms of symbol decision but it is within the amplitude range of the transition. As shown in FIG. 3, d(k−1) and d(k) are the decoded PAM-N symbols of two consecutive data samples at discrete time (k−1) and k, respectively. Let $d_{max}$, i.e., $d_{max}=\max[d(k-1), d(k)]$ denote the symbol which has larger amplitude, $d_{min}$, i.e., $d_{min}=\min[d(k-1), d(k)]$ denote the symbol which has smaller amplitude. If a transition is an even transition, then it has a corresponding reference level $V_n$ such that the hamming distance between $d_{max}$ and the symbol immediately above $V_n$ equals to the hamming distance between $d_{min}$ and the symbol immediately below $V_n$, i.e., $$h_e^{max} = h_e^{min}$$

where the hamming distance $$h_e^{max} = H(d_{max}, A_{n+1})$$

is the distance between $d_{max}$ and $A_{n+1}$ in terms of the number of symbols, and the hamming distance $$h_e^{min} = H(d_{min}, A_n)$$

is the distance between $d_{min}$ and $A_n$ in terms of the number of symbols.

A misaligned reference level $V_n(k)$ at discrete time k can be adjusted by minimizing the difference between the reference level and the expectation of amplitude (i.e., the pre-sliced values) of edge samples of even transitions, i.e., $$\min_{V_n} E[e_a(k) - V_n]^2 \quad (1)$$

$$\text{subject to: } h_e^{max} = h_e^{min}$$

where $e_a(k)$ is the amplitude of an edge sample (prior to slicing) such that its phase is a half user interval (UI) away from its adjacent data symbols d(k−1) and d(k) as shown in FIG. 3. The constraint ($h_e^{max}=h_e^{min}$) ensures that only even transitions are used for the adjustment of reference level based on Eq. (1).

Let μ, i.e., 0<μ<1 denote a constant for the control of the step size of reference level adjustment, and $E_n(k)$ denote the sign of the error between reference level $V_n(k)$ and its corresponding optimum decision boundary at discrete time k. An iterative solution of the problem in Eq. (1) is given by $$V_n(k+1) = V_n(k) - \mu E_n^d(k) \quad (2)$$

where $$E_n(k) = \begin{cases} 1 & \text{if } [(h_e^{max} == h_e^{min}) \cap (h_{edge}^{max} > h_{edge}^{min})] \\ -1 & \text{if } [(h_e^{max} == h_e^{min}) \cap (h_{edge}^{max} < h_{edge}^{min})] \\ 0 & \text{else} \end{cases} \quad (3)$$

and hamming distances $$h_{edge}^{max} = H\{\max[(d(k-1), d(k)], e(k)\}$$

$$h_{edge}^{min} = H\{\min[(d(k-1), d(k)], e(k)\}$$

Figure 4:
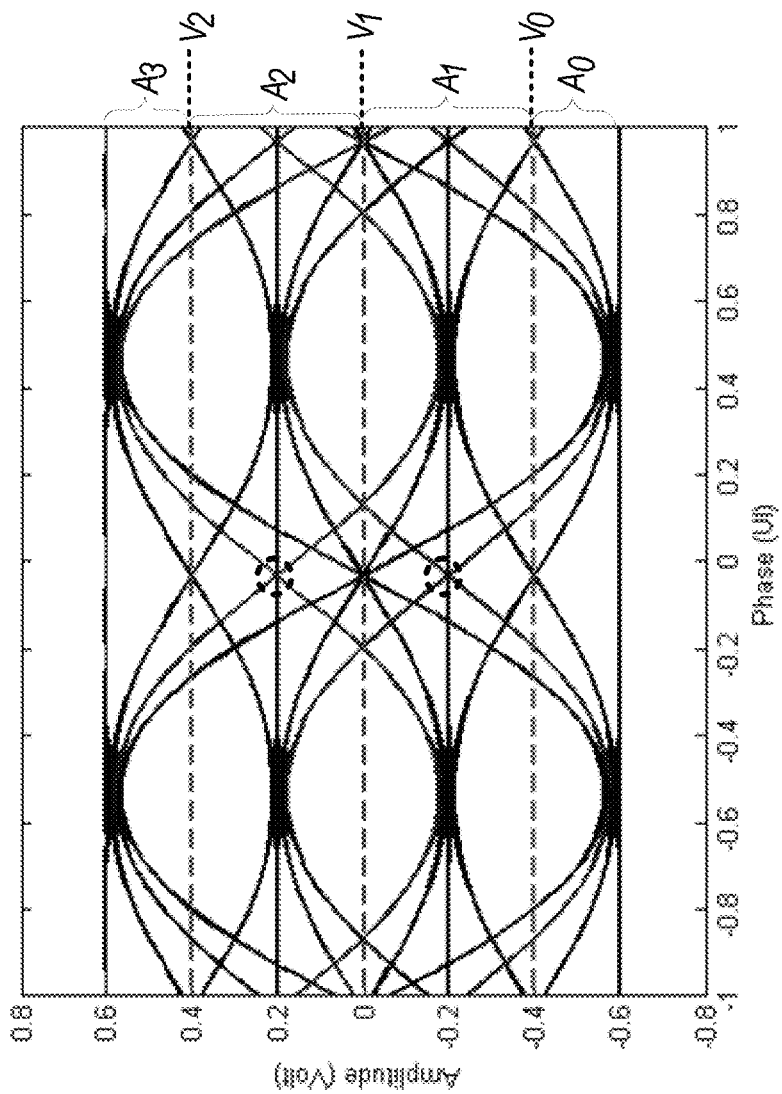
FIG. 4 is an eye diagram illustrating odd transitions in a PAM-4 receiver with ideally calibrated reference voltages.

FIG. 4 is an eye diagram illustrating examples of "odd data transitions" between consecutive data symbols d(k−1), d(k) received by a PAM-N receiver 100, where the waveforms show the pre-sliced amplitude of the signals. In the odd data transitions, an odd number of symbols or decision regions are crossed in a transition between consecutive data symbols. For example, in a PAM-4 receiver, the following transitions comprise odd transitions: $A_0 \rightarrow A_1 \rightarrow A_2$, $A_1 \rightarrow A_2 \rightarrow A_3$, $A_3 \rightarrow A_2 \rightarrow A_1$, and $A_2 \rightarrow A_1 \rightarrow A_0$.

Ideally, the reference voltages are set so that the crossings (those in the dashed circles in FIG. 4) of odd transitions lie at the midpoint between two adjacent reference levels. If a transition is an odd transition, then it has a center symbol $A_n$ such that the center symbol has equal hamming distances to $d_{min}$ and $d_{max}$, i.e., $$h_o^{max} = h_o^{min}$$

where hamming distances $h_o^{max}$ and $h_o^{min}$ are given by $$h_o^{max} = H(d_{max}, A_n)$$

and $$h_o^{min} = H(d_{min}, A_n)$$

Figure 5:
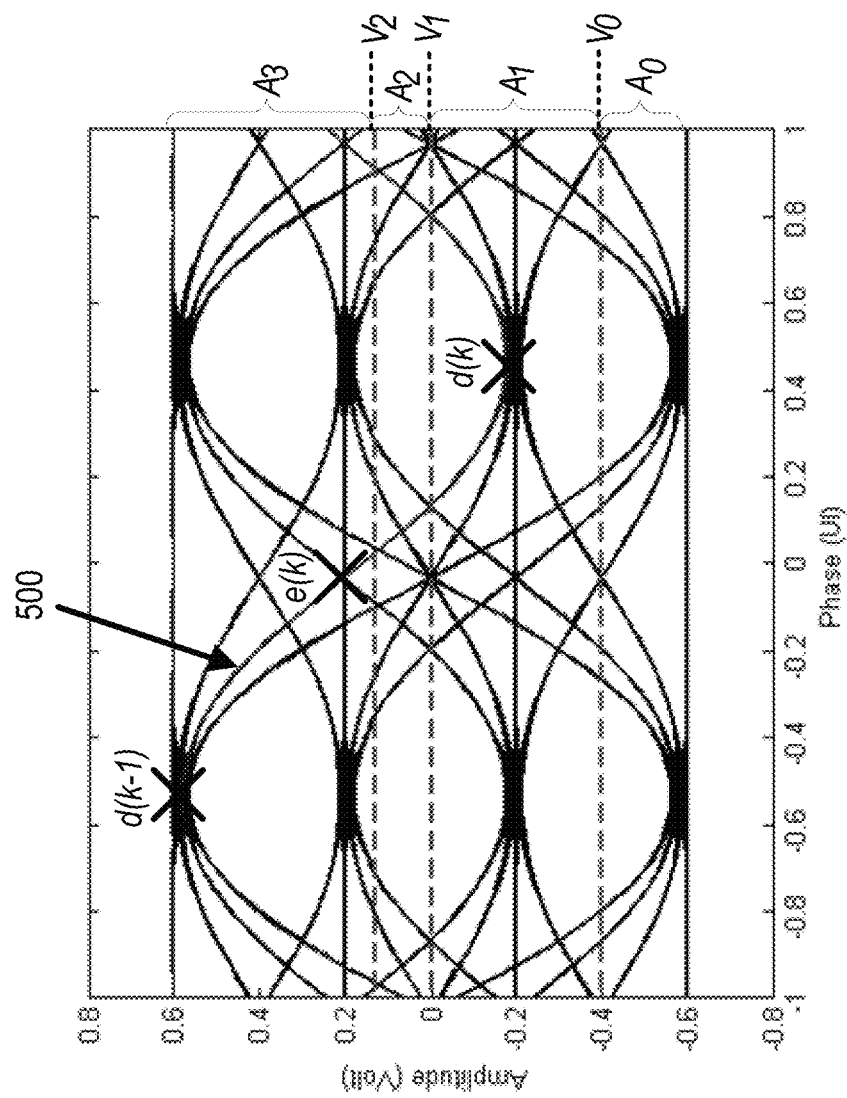
FIG. 5 is an eye diagram illustrating even transitions in a PAM-4 receiver with non-ideally calibrated reference voltages.

For example, the transition 500 shown in FIG. 5 has a center symbol $A_2$. Its hamming distances to $d_{min}$ and $d_{max}$ are equal to 1.

If reference levels $V_{n-1}(k)$ and $V_n(k)$, are the lower and upper boundaries of the center symbol on an odd transition, its offset can be detected and adjusted by minimizing the expectation of the difference between the decoded symbol of an edge symbol, i.e., e(k), and the center symbol of the odd transition, i.e., $$\min_{V_{n-1}, V_n} E[e(k) - A_n]^2 \quad (4)$$

$$\text{subject to } h_o^{max} = h_o^{min}$$

An iterative solution of the optimization problem in Equation (4) can be derived as $$V_{n-1}(k+1) = V_{n-1}(k) - \mu E_{n-1}(k) \quad (5)$$

and $$V_n(k+1) = V_n(k) - \mu E_n(k) \quad (6)$$

where $$E_{n-1}(k) = \begin{cases} 1 & \text{if } [(h_o^{max} == h_o^{min}) \cap (h_{edge}^{max} > h_{edge}^{min})] \\ 0 & \text{else} \end{cases} \quad (7)$$

$$E_n(k) = \begin{cases} -1 & \text{if } [(h_o^{max} == h_o^{min}) \cap (h_{edge}^{max} < h_{edge}^{min})] \\ 0 & \text{else} \end{cases} \quad (8)$$

$V_{n-1}$ and $V_n$ are the lower decision boundary and upper decision boundary of the center symbol $A_n$ on an odd transition, respectively.

Figure 6:
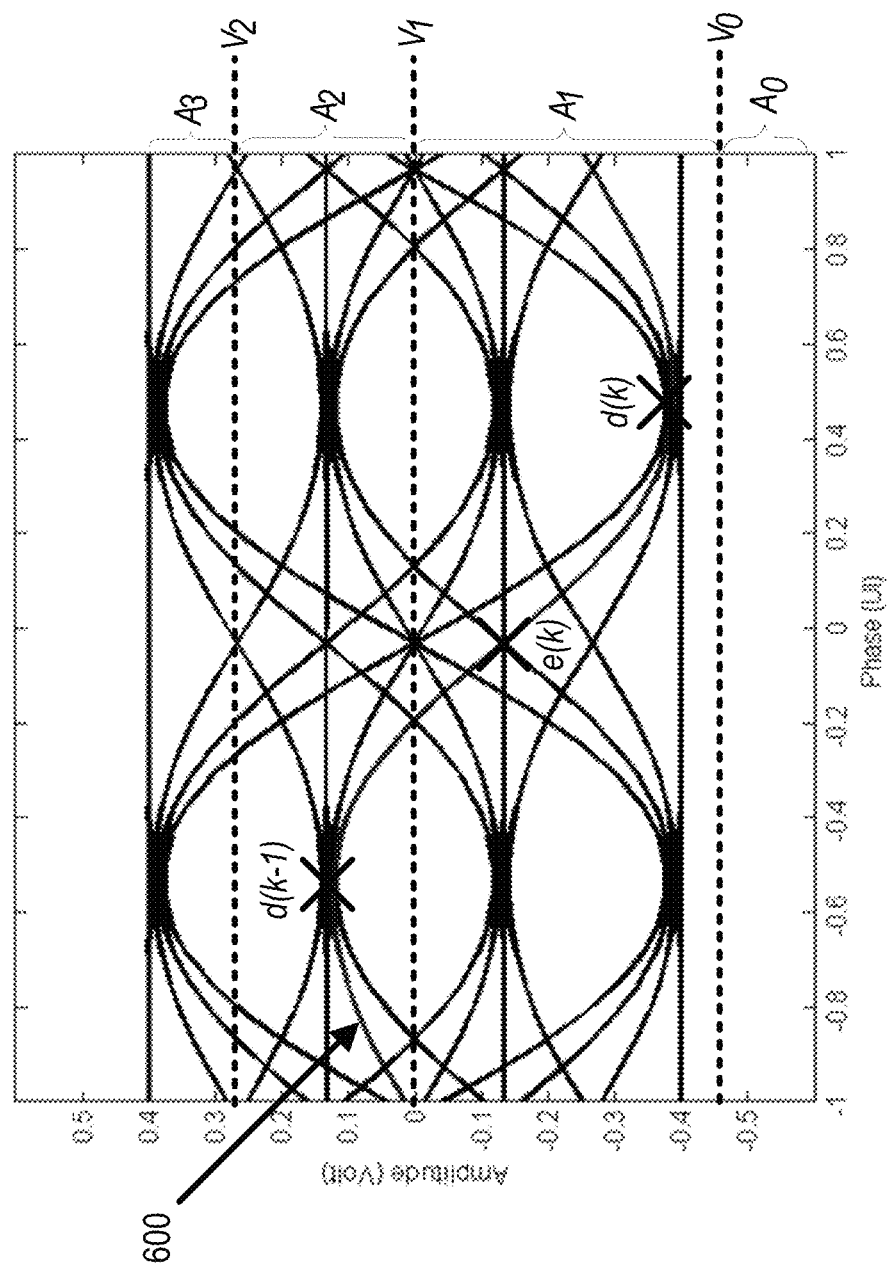
FIG. 6 is an eye diagram illustrating pseudo-even transitions in a PAM-4 receiver.

An odd transition is detected as an even transition in case a reference level is beyond the range of an odd transition. For example, in FIG. 6, the transition 600 should correspond to an odd transition which has three transmitted symbols $A_2 \rightarrow A_1 \rightarrow A_0$, but is detected as an even transition such as $A_2 \rightarrow A_1$ due to misaligned reference level $V_0$ which is out of the transition range. Let $V_{high}(k)$ and $V_{low}(k)$ denote the two reference levels which are immediately outside the amplitude range of a transition being detected. They can be updated as $$V_{high}(k+1) = V_{high}(k) - \mu E_{high}(k) \quad (9)$$

$$V_{low}(k+1) = V_{low}(k) - \mu E_{low}(k) \quad (10)$$

where $$E_{high}(k) = \begin{cases} 1 & \text{if } \{ [\text{mod}(h_d, 2) == 1] \cap (h_{edge}^{max} \leq h_{edge}^{min}) \} \\ 0 & \text{else} \end{cases} \quad (11)$$

$$E_{low}(k) = \begin{cases} -1 & \text{if } \{ [\text{mod}(h_d, 2) == 1] \cap (h_{edge}^{max} \geq h_{edge}^{min}) \} \\ 0 & \text{else} \end{cases} \quad (12)$$

and hamming distance $$h_d = H[d(k-1), d(k)]$$

Figure 7:
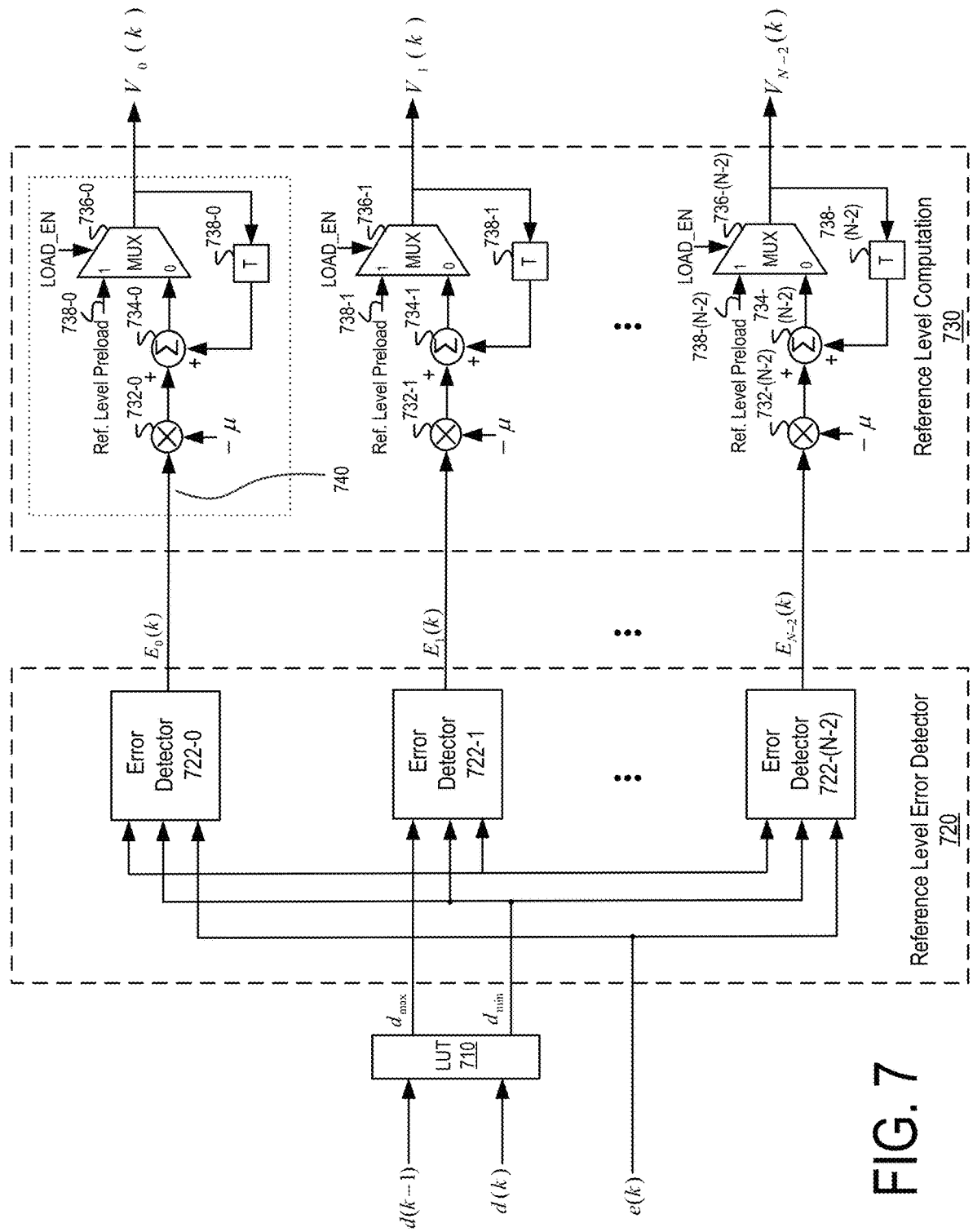
FIG. 7 is an embodiment of a reference level adaptation circuit for a PAM-N receiver.

An embodiment of a reference level adaptation circuit 700 that may be part of the calibration circuit 170 is illustrated in FIG. 7. The reference level adaptation circuit 700 comprises a lookup up table (LUT) 710, a reference level error detector circuit 720 and a reference level computation circuit 730. The lookup table 710 receives consecutive data symbols $d(k-1)$, $d(k)$ and performs a lookup in a lookup table to determine the maximum symbol $d_{max}$ and the minimum symbol $d_{min}$ of the two symbols. The reference level error detector circuit 720 includes an error detector circuit 722-0, 722-1, . . . 722-(N-2) corresponding to each reference voltage. Each error detector 722 generates an error signal $E(k)$ based on the minimum symbol $d_{min}$, the maximum symbol $d_{max}$, and the edge symbol $e(k)$ between the consecutive data symbols $d(k-1)$, $d(k)$. The error detector 722 determines, based on a detected type of transition (e.g., even transition, odd transition, pseudo-even transition), an error between a current reference voltage $V(k)$ and the optimal decision boundary. In one embodiment, the error signal $E(k)$ represents the sign of the error (e.g., positive, negative, or zero). The reference level computation circuit 730 receives the error signals $E(k)$ for each reference voltage and generates updated reference voltages $V(k)$ based on the error. In one embodiment, the reference level computation circuit 730 comprises a reference level adjustment circuit 740 corresponding to each reference voltage. Each computation circuit includes a multiplier 732, a summation circuit 734, a multiplexer 736, and a delay circuit 738. The multiplier circuit 732 multiplies the error signal by a gain value $(-\mu)$ as described in equations (2), (5)/(6) and (9)/(10) above. When the multiplexer 736 is set to select the output from the summation circuit 734, the summation circuit 734 and delay circuit T 738 operate as an integrator to integrate the output from the multiplier 732 to smooth the adjustment of the reference voltage. The reference level preload signal 738 comprises a predefined initial value that may be set differently for each of the reference voltages. The multiplexer 736 is configured to select this initial value to set the reference voltages when the receiver 100 is first initialized.

Figure 8:
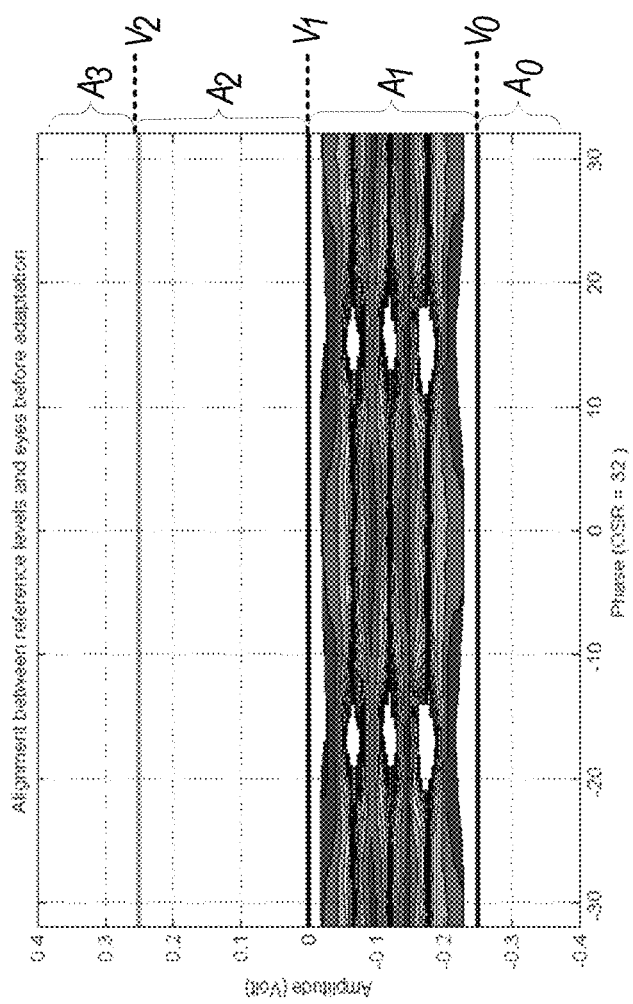
FIG. 8 is an eye diagram illustrating a signal in a PAM-4 receiver with misaligned DC offset and/or gain.

FIG. 8 is a waveform diagram showing an extreme case in which data transitions cannot be detected due to misalignment between the initial reference levels and an incoming signal. As seen in this diagram, the incoming signal is entirely between reference voltage $V_0$ and reference voltage $V_1$, thus resulting in every symbol being detected as $A_1$. To compensate for this case, a DC offset is first corrected by balancing symbol distribution near the center reference level such that the incoming signal is overlapping with center reference level. Then, the AFE gain and DC offset can be dynamically adjusted to ensure proper operation of the PAM-N receiver.

In one embodiment, the DC offset can be adapted by fixing the center reference level at zero volts and then offsetting the incoming signal by a varying amount until the difference in the numbers of decoded symbol above center reference level and below center reference level falls into a pre-defined range.

The offset voltage for DC offset correction at discrete time k is given by $$w(k+1) = w(k) - \mu_{dc} \left[ \sum_{n=\frac{N}{2}}^{N-1} c(A_n) - \sum_{n=0}^{\frac{N}{2}-1} c(A_n) \right] \quad (13)$$

where $0 < \mu_{dc} < 1$ is a scaling factor which is used to control the step size of DC offset compensation and $c(A_n)$ represents the number of symbol decision $A_n$ in an evaluation window.

Normally, DC offset adaptation using the above approach is not required. It is only used to handle applications with an extreme corner case where the incoming signal has no overlap with the initial reference levels. In such a case, data transitions are not detectable. After the initial coarse DC offset adaptation, data transitions of the received signal become detectable and can be used for sampler reference level adaptation. For PAM-N modulation where N is an even number, DC offset can be compensated by offsetting the incoming signal such that the adapted center reference level is zero volts. For PAM-N modulation where N is an odd number, DC offset can be compensated by offsetting the incoming signal such that the two reference levels near zero volts have opposite-polarity voltages.

The offset voltage for DC offset correction while jointly adapting with reference levels is given by $$w(k+1) = w(k) - \mu_{dc} V_{DC}(k) \quad (14)$$

where $V_{DC}(k)$ is calculated based on adapted sampler reference levels at discrete time k, i.e., $$V_{DC}(k) = \begin{cases} V_{\frac{N-2}{2}}(k) & \text{if } N \text{ is an even number} \\ \frac{[V_{\frac{N-1}{2}}(k) + V_{\frac{N-3}{2}}(k)]}{2} & \text{if } N \text{ is an odd number} \end{cases} \quad (15)$$

AFE gain can be adapted by optimizing gain settings such that the difference between the adapted reference level and a pre-determined target level is minimized. It can be derived that the least-mean-square solution of AFE gain at discrete time k is $$g(k+1)=g(k)-\mu_g[V_{N-2}(k)-V_0(k)-V_T] \quad (15)$$

where $\mu_g$ is a constant for the control of the step size of gain adjustment, $V_T$ represents the desired difference between the maximum PAM-N reference level $V_{N-2}$ and minimum reference PAM-N level $V_0$.

DC offset compensation changes the baseline of the incoming signal, and thus reference levels are re-adapted whenever DC offset compensation changes. In addition, symbol decision boundaries and DC offset may change with AFE gains. Thus joint adaptation of reference levels, DC offset, and AFE gain is desired.

Figure 9:
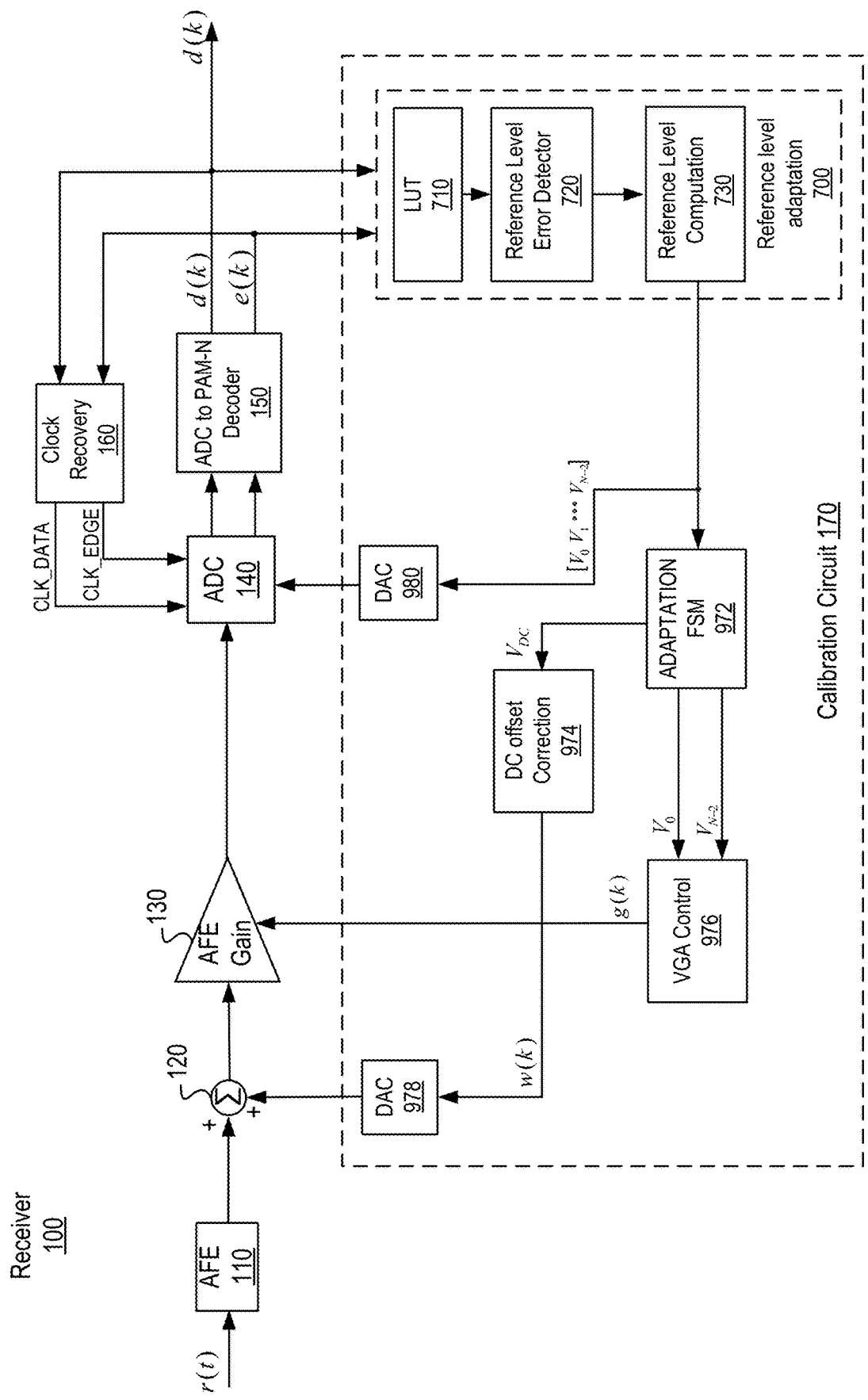
FIG. 9 is an embodiment of a PAM-N receiver with jointly adapting DC offset, gain, and reference voltages.

An example calibration circuit 170 for a PAM-N receiver 100 that provides joint reference level, DC offset, and AFE gain adaptation is shown in FIG. 9. The calibration circuit 170 comprises a reference level adaptation circuit 700 (such as the reference level adaptation circuit 700 shown in FIG. 7), an adaptation finite state machine (FSM) 972, a variable gain amplifier (VGA) control circuit 976, a DC offset correction circuit 974 and digital-to-analog (DAC) converters 978, 980. The reference level adaptation circuit 700 comprises a lookup table 710, reference level error detector circuit 720, and a reference level computation circuit 730 that collectively operate to generate a set of digital reference voltages $V_0, \ldots, V_{N-2}$ based on the data symbols d(k) and edge symbols e(k) as described above with reference to FIG. 7. The DAC 980 converts the digital reference voltages to analog signals used by the ADC 140. The adaptation FSM 972 determines a DC offset voltage $V_{DC}$ based on the data symbols d(k) and edge symbols e(k) as described in Eq. (15) above. The DC offset correction circuit 974 then determines a digital DC offset correction w(k) to apply to the incoming signal (via DAC 978 and summation circuit 120) based on Eq. (14) above. During initialization, in the extreme case in which data transitions cannot be detected due to misalignment between the initial reference levels and incoming signal (as shown in FIG. 8), the DC offset correction circuit 974 may instead generate a digital DC offset correction signal w(k) using the technique described with respect to Eq. (13) above. The DAC 978 converts the DC offset correction signal w(k) to an analog signal to be combined with the incoming signal via summation circuit 120. The adaptation FSM 972 also passes the lowest and highest reference voltages, $V_0$, $V_{N-2}$ respectively, to the VGA control circuit 976. The VGA control circuit 976 generates a gain control signal g(k) to control the gain of applied by the AFE gain circuit 130 as described in Eq. (15) above.

Figure 10:
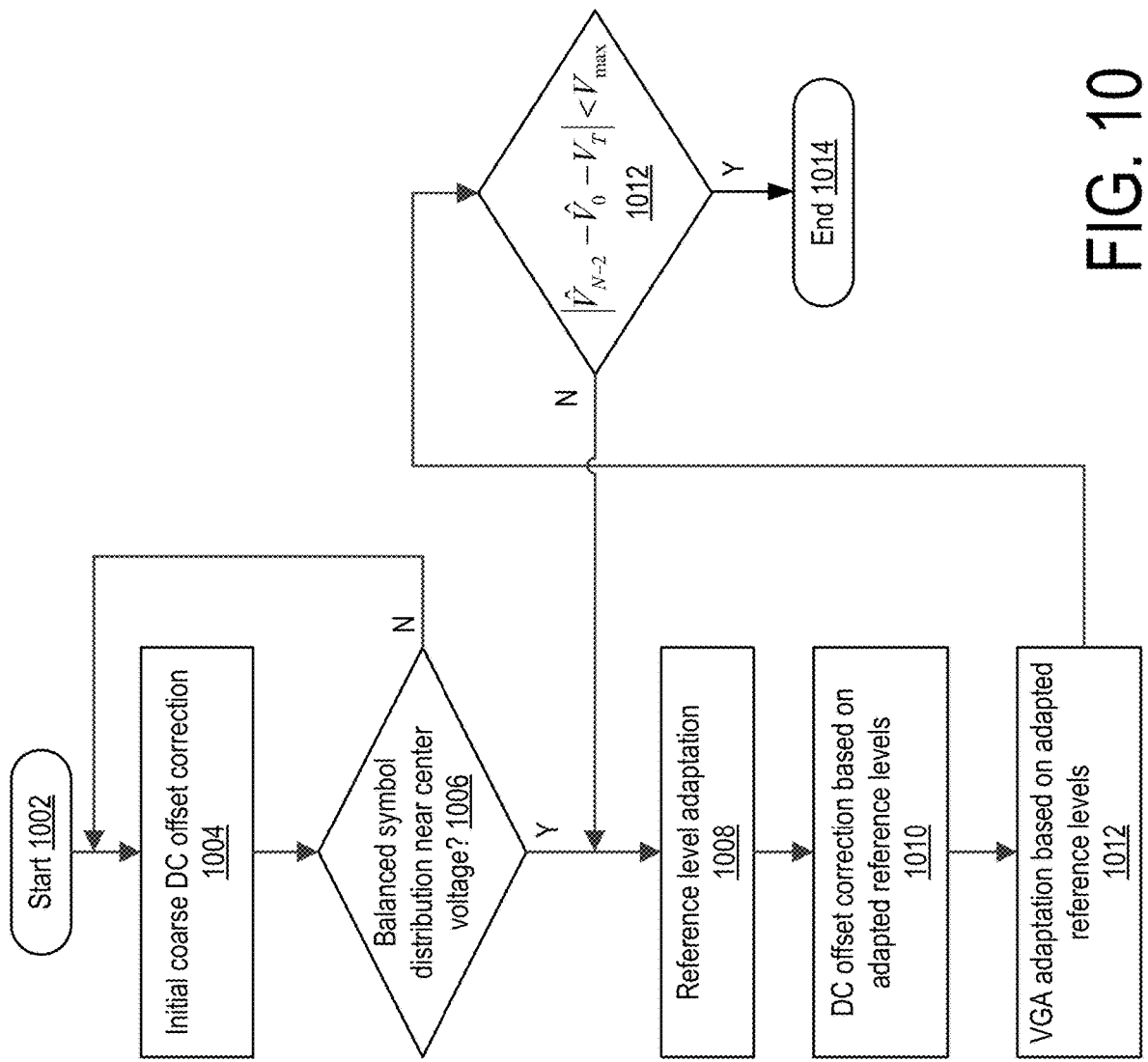
FIG. 10 is a flowchart illustrating an embodiment of a process for jointly adapting DC offset, gain, and reference voltages in a PAM-N receiver.

FIG. 10 illustrates an embodiment of a process performed by the calibration circuit 170 shown in FIG. 9. The process starts 1002 and the calibration circuit 170 performs 1004 an initial coarse DC offset correction to improve the balance of symbol distribution if needed as explained above with reference to Eq. (13). If at decision block 1006, the symbol distribution is not balanced near a center voltage (e.g., within a predefined threshold of zero volts), the process loops back to step 1004 to continue adjusting the DC offset correction. If at decision block 1006, the symbol distribution is sufficiently balanced, the process continues. After initial DC calibration, the calibration circuit 170 performs 1008 reference level adaptation based on the data symbols d(k) and edge symbols e(k) as described above. Based on the adapted reference levels, the calibration circuit 170 performs 1010 DC offset correction and performs 1012 VGA adaptation. The calibration circuit 170 determines 1012 if the difference between the highest reference voltage $V_{N-2}$ and the lowest reference voltage $V_0$ is within a threshold $V_{max}$ of the desired voltage difference VT. If this criteria is not met, the process loops back to step 1008 to perform additional adjustment to the reference voltages, DC offset, and VGA. Otherwise, the process ends 1014.

Figure 11A:
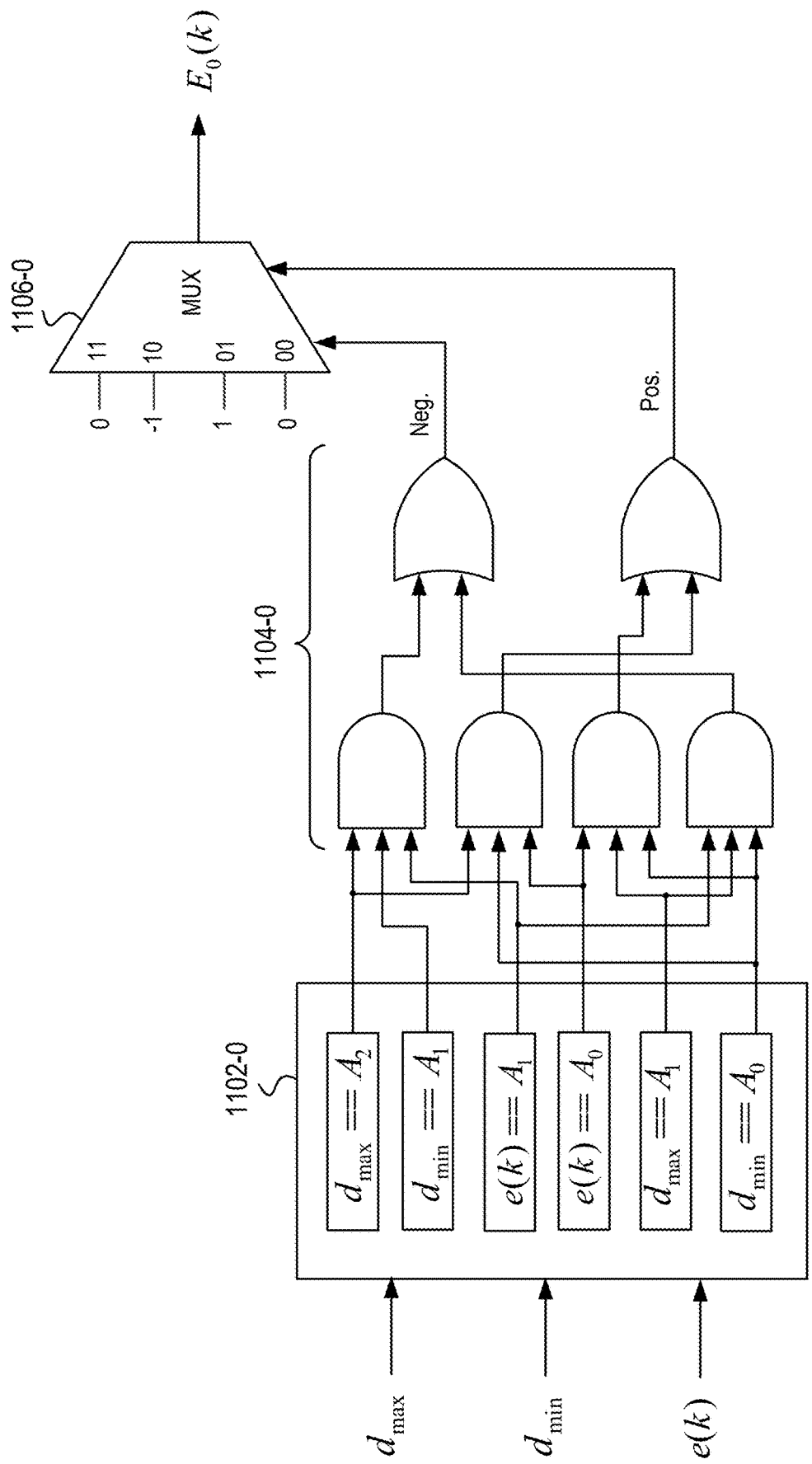
FIG. 11A is an embodiment of an error detection circuit for a first reference voltage in a PAM-4 receiver.
Figure 11B:
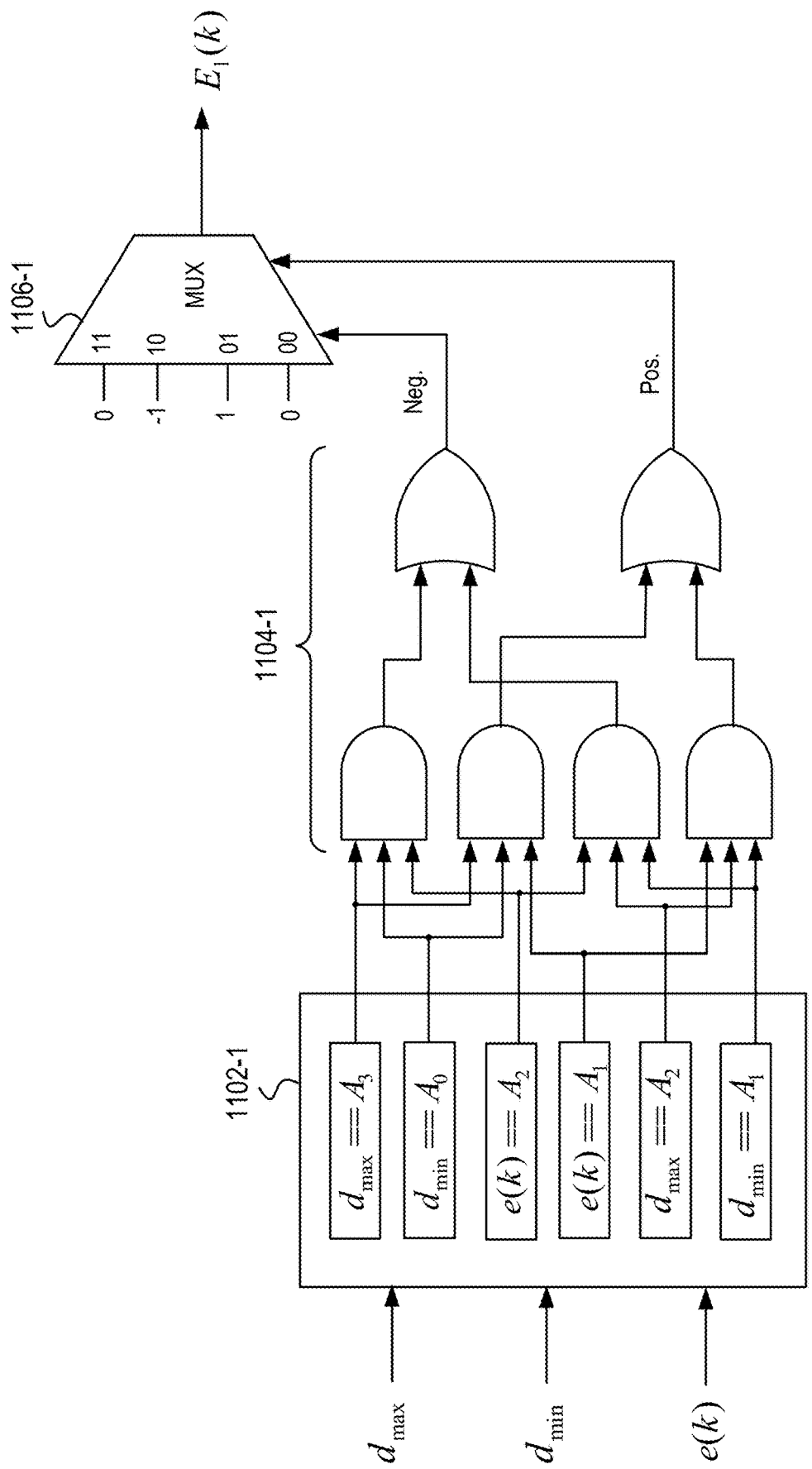
FIG. 11B is an embodiment of an error detection circuit for a second reference voltage in a PAM-4 receiver.
Figure 11C:
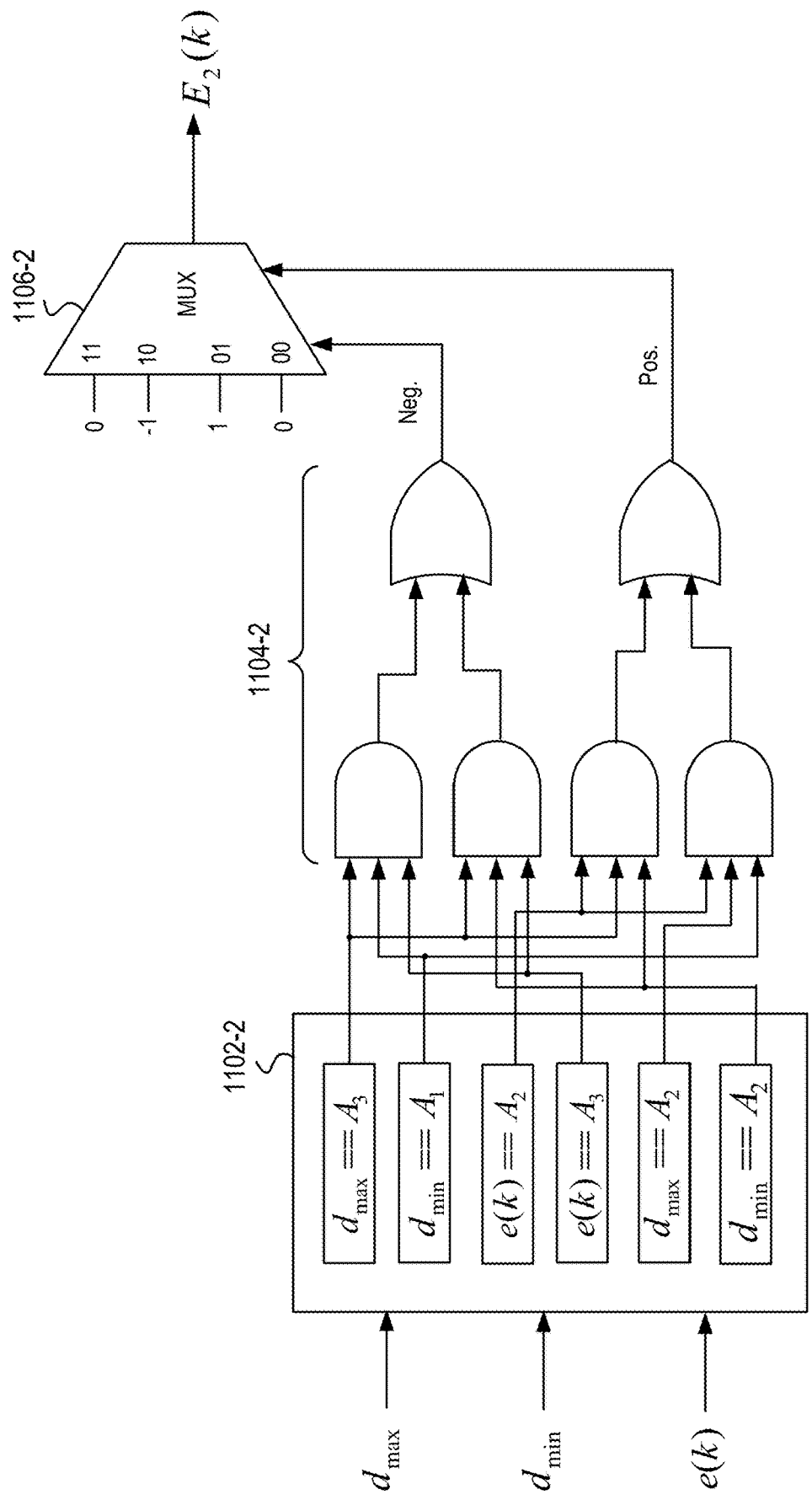
FIG. 11C is an embodiment of an error detection circuit for a third reference voltage in a PAM-4 receiver.

FIGS. 11A-11C illustrate example implementations of error detector circuits 722 for reference voltages $V_0$, $V_1$, and $V_2$ respectively of an example PAM-4 receiver. In these example embodiments, the error detector circuits 722 each generate an error signal ($E_0(k)$, $E_1(k)$, $E_2(k)$ respectively) used to adjust the reference voltages ($V_0$, $V_1$, and $V_2$ respectively) based on even transitions, odd transitions, and pseudo-even transitions that meet specified transition criteria. Particularly, in the illustrated embodiments, a digital comparator logic circuit 1102 compares the digital values of different pairs of symbols $d_{max}$, $d_{min}$, e(k) and outputs a logic high signal responsive to matches. A set of logic gates 1104 (e.g., AND gates and OR gates) generate a two-bit select signal (Neg., Pos.) that control a multiplexer 1106 to output either a 0, −1, or 1 as error signal E(k) corresponding to a pair of consecutive data symbols d(k−1), d(k) and edge symbol e(k). For even transitions, the error detector circuits 722 output a positive error signal if the edge symbol is equal to the symbol immediately below the first reference voltage of the transition and output a negative error signal if the edge symbol is equal to the symbol immediately above the reference voltage. In other words, error signals based on even transitions are given by:

$$E_0(k) = \begin{cases} -1 & \text{if } [(e(k) == A_1) \cap (d_{max} == A_1) \cap (d_{min} == A_0)] \\ 1 & \text{if } [(e(k) == A_0) \cap (d_{max} == A_1) \cap (d_{min} == A_0)] \\ 0 & \text{else} \end{cases} \quad (16)$$

$$E_1(k) = \begin{cases} -1 & \text{if } [(e(k) == A_2) \cap (d_{max} == A_2) \cap (d_{min} == A_1)] \\ 1 & \text{if } [(e(k) == A_1) \cap (d_{max} == A_2) \cap (d_{min} == A_1)] \\ -1 & \text{if } [(e(k) == A_2) \cap (d_{max} == A_3) \cap (d_{min} == A_0)] \\ 1 & \text{if } [(e(k) == A_1) \cap (d_{max} == A_3) \cap (d_{min} == A_0)] \\ 0 & \text{else} \end{cases} \quad (17)$$

$$E_2(k) = \begin{cases} -1 & \text{if } [(e(k) == A_3) \cap (d_{max} == A_3) \cap (d_{min} == A_2)] \\ 1 & \text{if } [(e(k) == A_2) \cap (d_{max} == A_3) \cap (d_{min} == A_2)] \\ 0 & \text{else} \end{cases} \quad (18)$$

where $E_0(k)$, $E_1(k)$ and $E_2(k)$ are the estimated errors of sampler reference levels $V_0(k)$, $V_1(k)$ and $V_2(k)$, respectively.

As described above, odd transitions involve crossing a center symbol equidistant from the first and second data symbols d(k−1), d(k) in the transition bound by an upper reference voltage and a lower reference voltage. For odd transitions, the error detector circuits 722 output a positive error signal for the minimum reference voltage if the amplitude of an edge symbol is less than the amplitude of the middle symbol, and output a negative error signal for the maximum reference voltage if the edge symbol is greater than the middle symbol. In other words, error signals based on odd transitions are given by:

$$E_0(k) = \begin{cases} 1 & \text{if } [(e(k) == A_0) \cap (d_{max} == A_2) \cap (d_{min} == A_0)] \\ 0 & \text{else} \end{cases} \quad (19)$$

and $$E_2(k) = \begin{cases} -1 & \text{if } [(e(k) == A_3) \cap (d_{max} == A_3) \cap (d_{min} == A_1)] \\ 0 & \text{else} \end{cases} \quad (20)$$

where $V_0(k)$ and $V_2(k)$ are the low-voltage and high-voltage PAM-4 reference levels, respectively. In alternative embodiments, non-zero error signals may be additionally generated based on other odd transitions not included in Eqs. (19)-(20) above. In the illustrated implementation, only a select set of odd transitions are used to simplify the architecture while still providing enough information to enable the reference voltages to be adjusted within an acceptable tolerance of their optimal values. In other embodiments, more or fewer types of odd transitions (including ignoring odd transitions completely) may be accounted for depending on the desired tradeoff To account for pseudo-even transitions, the error detector circuits 722 generates negative error signals for the lowest reference voltage $V_0$ if the edge symbol is equal to $d_{min}$, and generate a positive error signal for the highest reference voltage $V_2$ if the edge symbol is equal to $d_{max}$. In other words, error signals based on pseudo-even transitions are given by:

$$E_0(k) = \begin{cases} -1 & \text{if } [(e(k) == A_1) \cap (d_{max} == A_2) \cap (d_{min} == A_1)] \\ 0 & \text{else} \end{cases} \quad (21)$$

and $$E_2(k) = \begin{cases} 1 & \text{if } [(e(k) == A_2) \cap (d_{max} == A_2) \cap (d_{min} == A_1)] \\ 0 & \text{else} \end{cases} \quad (22)$$

In alternative embodiments, non-zero error signals may be additionally generated based on other pseudo-even transitions not included in Eqs. (21)-(22) above. In the illustrated implementation, only a select set of pseudo-even transitions are used to simplify the architecture while still providing enough information to enable the reference voltages to be adjusted within an acceptable tolerance of their optimal values. In other embodiments, more or fewer types of pseudo-even transitions (including ignoring pseudo-even transitions completely) may be accounted for depending on the desired tradeoff A combined reference level adaptation based on equations (16-22) of various transitions is given by $$V_n(k+1) = V_n(k) - \mu E_n(k) \quad (23)$$

where n=0, 1, 2 and $$E_0(k) = \begin{cases} -1 & \text{if } [(e(k) == A_1) \cap (d_{max} == A_1) \cap (d_{min} == A_0)] \\ 1 & \text{if } [(e(k) == A_0) \cap (d_{max} == A_1) \cap (d_{min} == A_0)] \\ 1 & \text{if } [(e(k) == A_0) \cap (d_{max} == A_2) \cap (d_{min} == A_0)] \\ -1 & \text{if } [(e(k) == A_1) \cap (d_{max} == A_2) \cap (d_{min} == A_1)] \\ 0 & \text{else} \end{cases} \quad (24)$$

$$E_1(k) = \begin{cases} -1 & \text{if } [(e(k) == A_2) \cap (d_{max} == A_2) \cap (d_{min} == A_1)] \\ 1 & \text{if } [(e(k) == A_1) \cap (d_{max} == A_2) \cap (d_{min} == A_1)] \\ -1 & \text{if } [(e(k) == A_2) \cap (d_{max} == A_3) \cap (d_{min} == A_0)] \\ 1 & \text{if } [(e(k) == A_1) \cap (d_{max} == A_3) \cap (d_{min} == A_0)] \\ 0 & \text{else} \end{cases} \quad (25)$$

$$E_2(k) = \begin{cases} -1 & \text{if } [(e(k) == A_3) \cap (d_{max} == A_3) \cap (d_{min} == A_2)] \\ 1 & \text{if } [(e(k) == A_2) \cap (d_{max} == A_3) \cap (d_{min} == A_2)] \\ -1 & \text{if } [(e(k) == A_3) \cap (d_{max} == A_3) \cap (d_{min} == A_1)] \\ 1 & \text{if } [(e(k) == A_2) \cap (d_{max} == A_2) \cap (d_{min} == A_1)] \\ 0 & \text{else} \end{cases} \quad (26)$$

Figure 12:
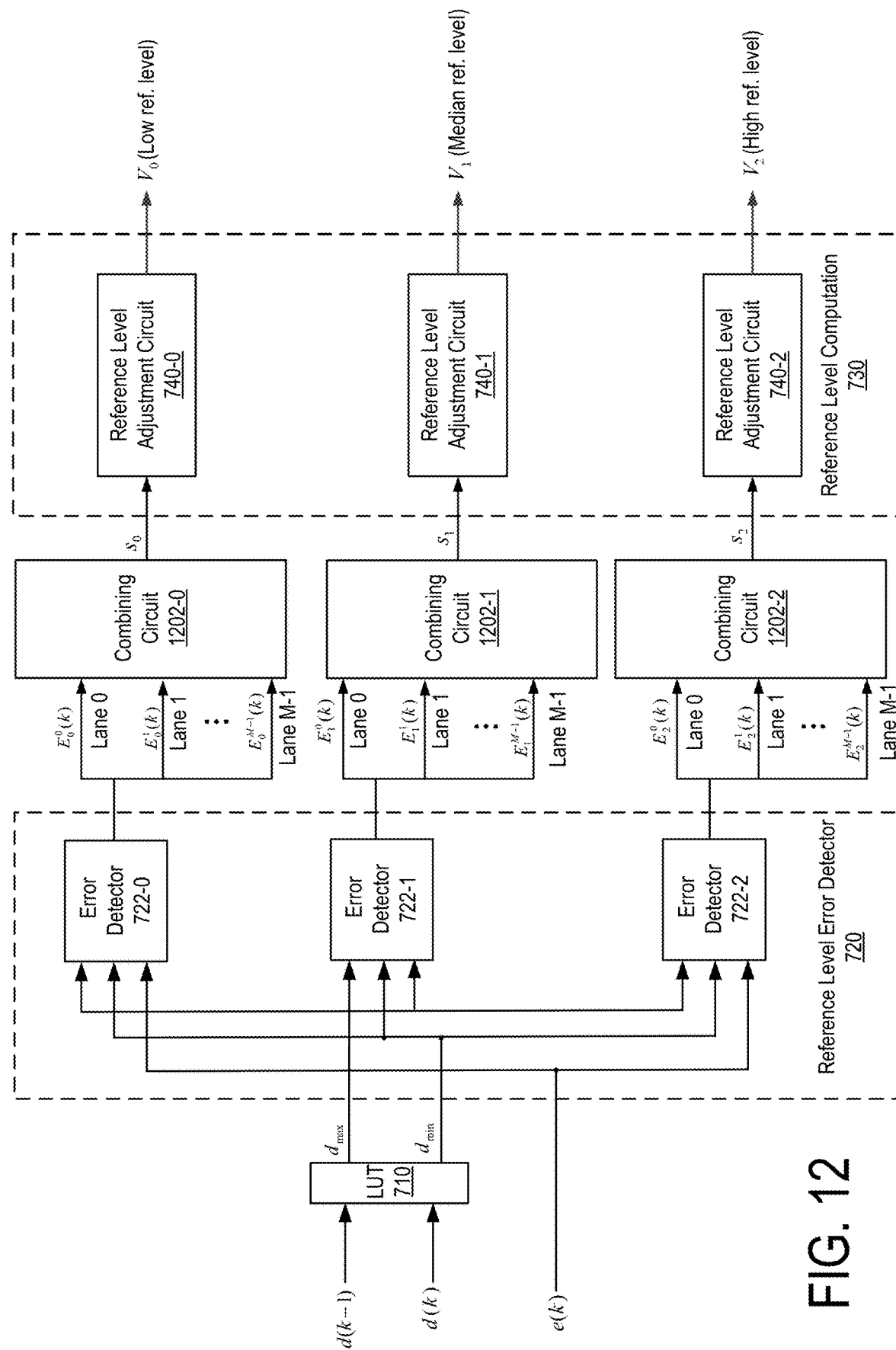
FIG. 12 is an embodiment of a PAM-4 reference level adaptation circuit for a PAM-4 receiver.

FIG. 12 illustrates an embodiment of a reference level adaptation circuit for a PAM-4 receiver using the error detection circuits described above. In this embodiment, the data symbols and edge symbols are de-serialized and parallel processed through M lanes. For example, the first lane for the adaptation of $V_0(k)$ detects $E_0^0(k)$ based on input signals d(k−1), d(k) and e(k). The (M−1) lane for the adaptation of $V_0(k)$ detects $E_0^{M-1}(k)$ based on input signals d(k−M), d(k−M+1) and e(k−M+1). Other lanes are processed similarly. The reference level error detected from different lanes, i.e., $E_0^m(k)$, for m=0, 1, . . . , M−1, are then passed to a combining circuit 1202-0 (e.g., an adder or a majority voter circuit) to form a cumulative reference level error $s_0(k)$ for the computation of reference level $V_0(k)$. For example, in one embodiment, the combining circuit 1202-0 increments a cumulative error value for each positive error value it receives, and decrements the cumulative error value for each negative error value it receives. The combining circuit 1202-0 then periodically updates the cumulative error signal $s_0(k)$. Because the error values are de-serialized in the combining circuit 1202, the update period for the cumulative error signal $s_0(k)$ is generally substantially longer than a sampling period for obtaining the decoded data symbols. The remaining reference voltages are similarly generated.

In alternative embodiments, reference level adaptation may be based on even transitions only (e.g., Eqs. (16)-(18)). Although robust reference level adaptation can still be achieved using only even transitions, the reference levels are likely to converge more quickly to their optimal or near-optimal levels if odd transitions and pseudo-even transitions are also used. In another alternative embodiment, reference level adaptation may be based on a combination of even and pseudo-even transitions only (e.g., Eqs. (16)-(18) and (21)-(22)) or a combination of even and odd transitions only (e.g., Eqs. (16)-(20)). Furthermore, in other alternatives embodiments, the principles described herein may be extended to PAM-8, PAM-16, or other types of receivers.

Upon reading this disclosure, those of ordinary skill in the art will appreciate still alternative structural and functional designs and processes for the described embodiments, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A method for adapting a DC offset in a receiver, the method comprising:
receiving an incoming signal;
applying a DC offset to an initial sequence of input data symbols in the incoming signal to generate an initial sequence of offset data symbols;

decoding the initial sequence of offset data symbols based on one or more reference voltages to generate an initial sequence of decoded data symbols;

performing an initial coarse DC offset correction to determine a coarse DC offset voltage by adjusting the DC offset applied to the initial sequence of input data symbols until a difference in a number of the decoded data symbols that are above a center reference level and a number of the decoded data symbols that are below the center reference level range over a predefined time interval falls within a predefined range;

following the initial coarse DC offset correction, decoding a subsequent sequence of input data symbols using the coarse DC offset voltage and the one or more reference voltages to generate a subsequent sequence of decoded data symbols; and adjusting the one or more reference voltages based on the subsequent sequence of output data symbols.

2. The method of claim 1, wherein adjusting the one or more reference voltages based on the subsequent sequence of output data symbols comprises:

receiving a first decoded data symbol at a first sample time, an edge symbol at an edge sample time following the first sample time, and a second decoded data symbol at a second sample time following the edge sample time;

determining, based on the first decoded data symbol, the second decoded data symbol, and the edge symbol, if a transition from the first decoded data symbol to the second data symbol meets transition criteria associated with an even transition such that an even number of symbols exist between the first and second decoded data symbols;

responsive to determining that the transition meets the transition criteria associated with the even transition, generating a first error signal to reduce an error between a first reference voltage between the first and second decoded data symbols and a midpoint between the first and second decoded symbols; and adjusting the first reference voltage based on the first error signal.

3. The method of claim 2, wherein determining that the transition meets the transition criteria comprises determining that an even number of symbols exists between the first decoded data symbol and the second decoded data symbol, and wherein adjusting the one or more reference voltages comprises:

adjusting a reference voltage in between the first decoded data symbol and the second decoded data symbol towards an amplitude of a pre-sliced edge sample corresponding to the edge symbol.

4. The method of claim 2, wherein determining that the transition meets the transition criteria comprises determining that an odd number of symbols exists between the first decoded data symbol and the second decoded data symbol, and wherein adjusting the one or more reference voltages comprises:

adjusting a reference voltage in between the first decoded data symbol and the second decoded data symbol towards a center symbol at a midpoint in between the first and second decoded data symbols.

5. The method of claim 2, wherein determining that the transition meets the transition criteria comprises determining that an even number of symbols exists between the first decoded data symbol and the second decoded data symbol and the edge symbol corresponds to a lesser of the first and second data symbols, and wherein adjusting the one or more reference voltages comprises:

increasing a lowest reference voltage of the one or more reference voltages.

6. The method of claim 2, wherein determining that the transition meets the transition criteria comprises determining that an even number of symbols exists between the first decoded data symbol and the second decoded data symbol and the edge symbol corresponds to a greater of the first and second data symbols, and wherein adjusting the one or more reference voltages comprises:

decreasing a highest reference voltage of the one or more reference voltages.

7. The method of claim 2, wherein adjusting the one or more reference voltages comprises:

incrementing a cumulative error value if the edge symbol is equal to the symbol immediately below a first reference voltage;

decrementing the cumulative error value if the edge symbol value is equal to the symbol immediately above the first reference voltage; and periodically updating a first error signal based on the cumulative error value, wherein an update period for updating the first error signal is longer than a sampling period for obtaining the decoded data symbols; and adjusting the first reference voltage based on the first error signal.

8. The method of claim 1, further comprising:

adjusting the coarse DC offset to determine an adapted DC offset based on the one or more reference voltages.

9. The method of claim 8, wherein the receiver comprises a PAM-N receiver in which N is an odd number, wherein adjusting the coarse DC offset comprises:

adjusting the coarse DC offset such that a center reference voltage of the one or more reference voltages is approximately zero volts.

10. The method of claim 8, wherein the receiver comprises a PAM-N receiver in which N is an even number, wherein adjusting the coarse DC offset comprises:

adjusting the coarse DC offset such that a pair of center reference voltages of the one or more reference voltages have opposite-polarity voltages.

11. A receiver circuit comprising:

an analog front end to receive an incoming signal;

a DC offset circuit to applying an initial DC offset to an initial sequence of input data symbols in the incoming signal to generate an initial sequence of offset data symbols, and to apply an adapted DC offset to a subsequent sequence of input data symbols after the initial sequence of input data symbols to generate a subsequent sequence of offset data symbols;

a decoder to decode the initial sequence of offset data symbols based on one or more reference voltages to generate an initial sequence of decoded data symbols, and to decode the subsequent sequence of input data symbols using the adapted DC offset and one or more reference voltages to generate a subsequent sequence of decoded data symbols;

a calibration circuit to perform an initial coarse DC offset correction to determine a coarse DC offset by adjusting the initial DC offset applied to the initial sequence of input data symbols until a difference in a number of the decoded data symbols that are above a center reference level and a number of the decoded data symbols that are below the center reference level range over a predefined time interval falls within a predefined range, to adjust the one or more reference voltages based on the subsequent sequence of decoded data symbols.

12. The receiver circuit of claim 11, wherein the calibration circuit comprises:
    an error detection circuit to receive a first decoded data symbol at a first sample time, an edge symbol at an edge sample time following the first sample time, and a second decoded data symbol at a second sample time following the edge sample time, and to determine, based on the first decoded data symbol, the second decoded data symbol, and the edge symbol, if a transition from the first decoded data symbol to the second data symbol meets transition criteria; and
    a reference level computation circuit to adjust the one or more reference voltages based on the transition responsive to determining that the transition meets the transition criteria.

13. The receiver circuit of claim 12, wherein the error detection circuit comprises logic to determine that an even number of symbols exists between the first decoded data symbol and the second decoded data symbol, and wherein the reference level computation circuit adjusts the one or more reference voltages by adjusting a reference voltage in between the first decoded data symbol and the second decoded data symbol towards an amplitude of a pre-sliced edge sample corresponding to the edge symbol.

14. The receiver circuit of claim 12, wherein the error detection circuit comprises logic to determine that the transition meets the transition criteria comprises determining that an odd number of symbols exists between the first decoded data symbol and the second decoded data symbol, and wherein the reference level computation circuit adjusts the one or more reference voltages by adjusting a reference voltage in between the first decoded data symbol and the second decoded data symbol towards a center symbol at a midpoint in between the first and second decoded data symbols.

15. The receiver circuit of claim 12, wherein the error detection circuit comprises logic to determine that an even number of symbols exists between the first decoded data symbol and the second decoded data symbol and the edge symbol corresponds to a lesser of the first and second data symbols, and wherein the reference level computation circuit adjusts the one or more reference voltages by increasing a lowest reference voltage of the one or more reference voltages.

16. The receiver circuit of claim 12, wherein the error detection circuit comprises logic to determine that an even number of symbols exists between the first decoded data symbol and the second decoded data symbol and the edge symbol corresponds to a greater of the first and second data symbols, and wherein the reference level computation circuit adjusts the one or more reference voltages by decreasing a highest reference voltage of the one or more reference voltages.

17. The receiver circuit of claim 12, wherein the reference level computation circuit is configured to increment a cumulative error value if the edge symbol is equal to the symbol immediately below a first reference voltage, decrement the cumulative error value if the edge symbol value is equal to the symbol immediately above the first reference voltage, periodically update a first error signal based on the cumulative error value, wherein an update period for updating the first error signal is longer than a sampling period for obtaining the decoded data symbols, and adjust the first reference voltage based on the first error signal.

18. The receiver circuit of claim 12, further comprising:
    an analog front end to receive an analog input signal and convert the analog input signal to digital samples; and
    a decoder to decode the digital samples to generate the first decoded data symbol and the second decoded data symbol.

19. The receiver circuit of claim 11, wherein the calibration circuit is further configured to adjust the coarse DC offset to determine the adapted DC offset based on the one or more reference voltages.

20. A receiver circuit comprising:
    an analog front end to receive an incoming signal;
    DC offset means for applying an initial DC offset to an initial sequence of input data symbols in the incoming signal to generate an initial sequence of offset data symbols, and for applying an adapted DC offset to a subsequent sequence of input data symbols after the initial sequence of input data symbols to generate a subsequent sequence of offset data symbols;
    decoding means for decoding the initial sequence of offset data symbols based on one or more reference voltages to generate an initial sequence of decoded data symbols, and for decoding the subsequent sequence of input data symbols using the adapted DC offset and one or more reference voltages to generate a subsequent sequence of decoded data symbols;
    calibration means for performing an initial coarse DC offset correction to determine a coarse DC offset by adjusting the initial DC offset applied to the initial sequence of input data symbols until a difference in a number of the decoded data symbols that are above a center reference level and a number of the decoded data symbols that are below the center reference level range over a predefined time interval falls within a predefined range, for adjusting the one or more reference voltages based on the subsequent sequence of decoded data symbols.

* * * * *